United States Patent Office.

RICHARD U. PIPER, OF GIRARD, MICHIGAN, ASSIGNOR OF ONE-HALF HIS RIGHT TO MONROE HEATH, OF CHICAGO, ILLINOIS.

IMPROVEMENT IN FIRE-PROOF COMPOUNDS FOR COATING ROOFS, &c.

Specification forming part of Letters Patent No. 135,152, dated January 21, 1873.

*To all whom it may concern:*

Be it known that I, RICHARD U. PIPER, of Girard, in the county of Branch and State of Michigan, have invented a new and Improved Fire-Proof Compound for Coating Roofs of Houses, Walls, and Sides of the same, &c.; and I hereby declare the following to be a full, clear, and exact description of the same, sufficient to enable those skilled in the art to fully understand my invention.

My compound may be made substantially as follows: I take one part of powdered sulphate of alumina, (alum;) one part powdered China clay; one part Glauber salts; and one part of wood or coal ashes, and form the same into a thick paste by adding a sufficient quantity of flour and water previously mixed or otherwise. This compound or cement may then be applied to wooden roofs, which are afterward to be covered with slate or tin, or to plain paper or wooden roofs; to the walls or sides of houses, or to any substance which it is desired to fire-proof. The compound can be applied with a brush, or with an ordinary mason's trowel. After this mixture or cement has been applied to wood or paper, it soon hardens and becomes an extremely durable coating. The flour paste is only used to hold the other parts of the cement together, and I do not, therefore, confine myself to any particular kind of flour or paste. Either wood or coal ashes may be used with about the same result, the object in the use of such being to obtain some thick incombustible mass. If wood ashes are used, the ley produced by the combination of water with the same has a great tendency to resist the action of flame. This compound may be used with great effect between the flooring and walls of rooms, halls, &c., of houses, as it not only prevents the communication of fire from one apartment to another, but has also a tendency to deaden sound. It may be used as a plaster finish for the walls of apartments, and in such instances the water of crystallization would, in case of fire, be driven from the compound in the form of steam, and in sufficient quantity to materially aid in extinguishing the flames. Another important feature of my compound is that, when applied to wood or paper, it has a tendency to Kyanize or preserve the same.

Having thus fully described my invention, what I claim, and desire to secure by Letters Patent, is—

The within-described compound for fire-proofing the surfaces of roofs, walls, &c., or any substance to which the same may be applied, substantially as set forth.

In testimony whereof I have hereunto set my hand this 3d day of January, 1873.

RICHARD U. PIPER.

Witnesses:
C. L. ROOT,
JNO. BERRY, Jr.